United States Patent
Gonion (10) Patent No.: US 9,122,485 B2
(45) Date of Patent: Sep. 1, 2015

(54) PREDICTING A RESULT OF A DEPENDENCY-CHECKING INSTRUCTION WHEN PROCESSING VECTOR INSTRUCTIONS

(75) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 994 days.

(21) Appl. No.: 13/090,001

(22) Filed: Apr. 19, 2011

(65) Prior Publication Data

US 2012/0191949 A1   Jul. 26, 2012

Related U.S. Application Data

(60) Provisional application No. 61/435,165, filed on Jan. 21, 2011.

(51) Int. Cl.
*G06F 15/00* (2006.01)
*G06F 9/30* (2006.01)
*G06F 9/40* (2006.01)
*G06F 9/38* (2006.01)

(52) U.S. Cl.
CPC .......... *G06F 9/3842* (2013.01); *G06F 9/30036* (2013.01); *G06F 9/30076* (2013.01); *G06F 9/3838* (2013.01)

(58) Field of Classification Search
None
See application file for complete search history.

(56) References Cited

U.S. PATENT DOCUMENTS

| | | | |
|---|---|---|---|
| 5,742,804 A * | 4/1998 | Yeh et al. ...................... | 712/237 |
| 6,792,524 B1 * | 9/2004 | Peterson et al. ............... | 712/235 |
| 2006/0155965 A1 * | 7/2006 | Altman et al. ................ | 712/215 |
| 2008/0288759 A1 * | 11/2008 | Gonion et al. ................ | 712/235 |

* cited by examiner

*Primary Examiner* — George Giroux
(74) *Attorney, Agent, or Firm* — Meyertons, Hood, Kivlin, Kowert & Goetzel, P.C.; Lawrence J. Merkel (57) ABSTRACT

The described embodiments include a processor that executes a vector instruction. In the described embodiments, while dispatching instructions at runtime, the processor encounters a dependency-checking instruction. Upon determining that a result of the dependency-checking instruction is predictable, the processor dispatches a prediction micro-operation associated with the dependency-checking instruction, wherein the prediction micro-operation generates a predicted result vector for the dependency-checking instruction. The processor then executes the prediction micro-operation to generate the predicted result vector. In the described embodiments, when executing the prediction micro-operation to generate the predicted result vector, if a predicate vector is received, for each element of the predicted result vector for which the predicate vector is active, otherwise, for each element of the predicted result vector, the processor sets the element to zero.

27 Claims, 4 Drawing Sheets

PREDICTING A RESULT OF A DEPENDENCY-CHECKING INSTRUCTION WHEN PROCESSING VECTOR INSTRUCTIONS

RELATED APPLICATIONS

This application is a non-provisional application from, and hereby claims priority under 35 U.S.C. §120 to, U.S. provisional patent application 61/435,165, entitled "Predicting a Result of a Dependency-Checking Instruction when Processing Vector Instructions," by inventor Jeffry E. Gonion, filed on 21 Jan. 2011.

This application is related to: (1) pending application Ser. No. 12/419,629, entitled "Method and Apparatus for Executing Program Code," by inventors Jeffry E. Gonion and Keith E. Diefendorff, filed on 7 Apr. 2009; (2) pending application Ser. No. 12/419,644, entitled "Break, Pre-Break, and Remaining Instructions for Processing Vectors," by inventors Jeffry E. Gonion and Keith E. Diefendorff, filed on 7 Apr. 2009; (3) pending application Ser. No. 12/419,661, entitled "Check-Hazard Instructions for Processing Vectors," by inventors Jeffry E. Gonion and Keith E. Diefendorff, filed on 7 Apr. 2009; (4) pending application Ser. No. 12/495,656, entitled "Copy-Propagate, Propagate-Post, and Propagate-Prior Instructions For Processing Vectors," by inventors Jeffry E. Gonion and Keith E. Diefendorff, filed on 30 Jun. 2009; (5) pending application Ser. No. 12/495,643, entitled "Shift-In-Right Instructions for Processing Vectors," by inventors Jeffry E. Gonion and Keith E. Diefendorff, filed on 30 Jun. 2009; (6) pending application Ser. No. 12/495,631, entitled "Increment-Propagate and Decrement-Propagate Instructions for Processing Vectors," by inventors Jeffry E. Gonion and Keith E. Diefendorff, filed on 30 Jun. 2009; (7) pending application Ser. No. 12/541,505, entitled "Running-Sum Instructions for Processing Vectors," by inventors Jeffry E. Gonion and Keith E. Diefendorff, filed on 14 Aug. 2009; (8) pending application Ser. No. 12/541,526, entitled "Running-AND, Running-OR, Running-XOR, and Running-Multiply Instructions for Processing Vectors" by inventors Jeffry E. Gonion and Keith E. Diefendorff, filed on 14 Aug. 2009; and (9) pending application Ser. No. 12/541,546, entitled "Running-Shift Instructions for Processing Vectors," by inventors Jeffry E. Gonion and Keith E. Diefendorff, filed 14 Aug. 2009.

This application is also related to: (1) pending application Ser. No. 12/873,043, entitled "Running-Min and Running-Max Instructions for Processing Vectors," by inventors Jeffry E. Gonion and Keith E. Diefendorff, filed 31 Aug. 2010; (2) pending application Ser. No. 12/873,063, entitled "Non-Faulting and First-Faulting Instructions for Processing Vectors," by inventors Jeffry E. Gonion and Keith E. Diefendorff, filed 31 Aug. 2010; (3) pending application Ser. No. 12/873,074, entitled "Vector Test Instruction for Processing Vectors" by inventors Jeffry E. Gonion and Keith E. Diefendorff, filed 31 Aug. 2010; (4) pending application Ser. No. 12/907,471, entitled "Select First and Select Last Instructions for Processing Vectors," by inventors Jeffry E. Gonion and Keith E. Diefendorff, filed 19 Oct. 2010; (5) pending application Ser. No. 12/907,490, entitled "Actual Instruction and Actual-Fault Instructions for Processing Vectors," by inventors Jeffry E. Gonion and Keith E. Diefendorff, filed 19 Oct. 2010; (6) pending application Ser. No. 12/977,333, entitled "Remaining Instruction for Processing Vectors," by inventors Jeffry E. Gonion and Keith E. Diefendorff, filed 23 Dec. 2010; and (7) pending application Ser. No. 13/006,243, entitled "Generate Predictes Instruction for Processing Vectors," by inventors Jeffry E. Gonion and Keith E. Diefendorff, filed 13 Jan. 2011.

This application is also related to: (1) pending application Ser. No. 12/237,212, entitled "Conditional Data-Dependency Resolution in Vector Processors," by inventors Jeffry E. Gonion and Keith E. Diefendorff, filed 24 Sep. 2008; (2) pending application Ser. No. 12/237,196, entitled "Generating Stop Indicators Based on Conditional Data Dependency in Vector Processors," by inventors Jeffry E. Gonion and Keith E. Diefendorff, filed 24 Sep. 2008; and (3) pending application Ser. No. 12/237,190, entitled "Generating Predicate Values Based on Conditional Data Dependency in Vector Processors," by inventors Jeffry E. Gonion and Keith E. Diefendorff, filed 24 Sep. 2008.

BACKGROUND

1. Field

The described embodiments relate to techniques for improving the performance of computer systems. More specifically, the described embodiments relate to predicting a result of a dependency-checking instruction when processing vector instructions.

2. Related Art

Recent advances in processor design have led to the development of a number of different processor architectures. For example, processor designers have created superscalar processors that exploit instruction-level parallelism (ILP), multi-core processors that exploit thread-level parallelism (TLP), and vector processors that exploit data-level parallelism (DLP). Each of these processor architectures has unique advantages and disadvantages which have either encouraged or hampered the widespread adoption of the architecture. For example, because ILP processors can often operate on existing program code that has undergone only minor modifications, these processors have achieved widespread adoption. However, TLP and DLP processors typically require applications to be manually re-coded to gain the benefit of the parallelism that they offer, a process that requires extensive effort. Consequently, TLP and DLP processors have not gained widespread adoption for general-purpose applications.

One significant issue affecting the adoption of DLP processors is the vectorization of loops in program code. In a typical program, a large portion of execution time is spent in loops. Unfortunately, many of these loops have characteristics that render them unvectorizable in existing DLP processors. Thus, the performance benefits gained from attempting to vectorize program code can be limited.

One significant obstacle to vectorizing loops in program code in existing systems is dependencies between iterations of the loop. For example, loop-carried data dependencies and memory-address aliasing are two such dependencies. These dependencies can be identified by a compiler during the compiler's static analysis of program code, but they cannot be completely resolved until runtime data is available. Thus, because the compiler cannot conclusively determine that runtime dependencies will not be encountered, the compiler cannot vectorize the loop. Hence, because existing systems require that the compiler determine the extent of available parallelism during compilation, relatively little code can be vectorized.

SUMMARY

The described embodiments include a processor that executes a vector instruction. In the described embodiments, while dispatching instructions at runtime, the processor encounters a dependency-checking instruction. Upon determining that a result of the dependency-checking instruction is predictable, the processor dispatches a prediction micro-operation associated with the dependency-checking instruction, wherein the prediction micro-operation generates a predicted result vector for the dependency-checking instruction. The processor then executes the prediction micro-operation to generate the predicted result vector. In the described embodiments, when executing the prediction micro-operation to generate the predicted result vector, if a predicate vector is received, for each element of the predicted result vector for which the predicate vector is active, otherwise, for each element of the predicted result vector, the processor sets the element to zero.

In the described embodiments, upon generating the predicted result vector, the processor records that subsequent vector instructions are being executed speculatively. The processor then uses the predicted result vector to execute subsequent vector instructions that depend on the result from the dependency-checking instruction.

In the described embodiments, the processor dispatches the dependency-checking instruction and executes the dependency-checking instruction to generate an actual result vector. Then, if the predicate vector is received, for each element of the predicted result vector for which the predicate vector is active, otherwise, for each element of the predicted result vector, the processor compares the element of the predicted result vector to the corresponding element of the actual result vector, and performs a remedial action if the predicted result vector differs from the actual result vector.

In the described embodiments, the processor maintains a record of an outcome of the comparison. In these embodiments, the record can include a record of prediction accuracy.

In the described embodiments, when the prediction accuracy is below a threshold value, the processor determines that the result of the dependency-checking instruction is unpredictable and awaits the generation of the actual result vector before executing subsequent dependent instructions.

In the described embodiments, the record of the prediction accuracy includes a confidence level represented by a value between a first value and a second value. In these embodiments, the processor determines that a result of the dependency-checking instruction is predictable when the value of the confidence level is within a predetermined distance of the first value.

In the described embodiments, when active elements of the actual result vector include both zeroes and other-valued elements, or when the active elements of the actual result vector include only other-valued elements, the processor adjusts the confidence level toward the second value, and when active elements of the actual result vector include only zeroes, the processor adjusts the confidence level toward the first value.

In the described embodiments, before dispatching subsequent vector instructions that depend on the dependency-checking instruction, the processor modifies the dependency of the subsequent vector instructions from using the actual result vector from the dependency-checking instruction to using the predicted result vector generated by the prediction micro-operation.

In the described embodiments, upon determining that the result is not predictable for the dependency-checking instruction, the processor dispatches the dependency-checking instruction, executes the dependency-checking instruction to generate an actual result vector, and uses the actual result vector to execute subsequent vector instructions that depend on the result from the dependency-checking instruction.

In the described embodiments, the processor uses one or more factors to make the determination if the result can be predicted for the dependency-checking instruction.

In the described embodiments, the prediction micro-operation received by the processor is decoded from a compiler-inserted prediction instruction.

In the described embodiments, upon determining that a result vector of the dependency-checking instruction is predictable, the processor generates a prediction micro-operation.

In the described embodiments, the dependency-checking instruction comprises a CheckHazard instruction or a ConditionalStop instruction.

BRIEF DESCRIPTION OF THE FIGURES

In the figures, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures, instructions, and code described in this detailed description can be stored on a computer-readable storage medium, which may be any device or medium that can store code and/or data for use by a computer system. The computer-readable storage medium includes, but is not limited to, volatile memory and non-volatile memory, such as magnetic and optical storage devices such as disk drives, magnetic tape, CDs (compact discs), DVDs (digital versatile discs or digital video discs), or other media capable of storing data structures or code. Although various types of computer-readable storage media can be used, the described embodiments do not include non-transitory computer readable storage media.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Macroscalar Architecture

The embodiments described herein are based in part on the Macroscalar Architecture that is described in U.S. patent application Ser. No. 12/977,333, entitled "Generate Predicates Instruction for Processing Vectors," by inventors Jeffry E. Gonion and Keith Diefendorff, filed on 23 Dec. 2010 (hereinafter "the '333 application"), the contents of which are incorporated by reference.

As described in the '333 application, the described embodiments provide an instruction set and supporting hardware that allow compilers to generate program code for loops without completely determining parallelism at compile-time, and without discarding useful static analysis information. Specifically, these embodiments provide a set of instructions that do not mandate parallelism for loops but instead enable parallelism to be exploited at runtime if dynamic conditions permit. These embodiments thus include instructions that enable code generated by the compiler to dynamically switch between non-parallel (scalar) and parallel (vector) execution for loop iterations depending on conditions at runtime by switching the amount of parallelism used.

These embodiments provide instructions that enable an undetermined amount of vector parallelism for loop iterations but do not require that the parallelism be used at runtime. More specifically, these embodiments include a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, the described embodiments execute the two elements in parallel. In these embodiments, expressing program code in a vector-length agnostic format enables a broad range of vectorization opportunities that are not present in existing systems.

In the described embodiments, during compilation, a compiler first analyzes the loop structure of a given loop in program code and performs static dependency analysis. The compiler then generates program code that retains static analysis information and instructs processor 102 how to resolve runtime dependencies and process the program code with the maximum amount of parallelism possible. More specifically, the compiler provides vector instructions for performing corresponding sets of loop iterations in parallel, and provides vector-control instructions for dynamically limiting the execution of the vector instructions to prevent data dependencies between the iterations of the loop from causing an error (which can be called "vector partitioning"). This approach defers the determination of parallelism to runtime, where the information on runtime dependencies is available, thereby allowing the software and processor to adapt parallelism to dynamically changing conditions.

Terminology

Throughout the description, we use the following terminology. These terms may be generally known in the art, but are described below to clarify the subsequent descriptions.

The term "active element," as used in this description to refer to one or more elements of a vector, indicates elements that are operated on during a given operation. Generally, the described embodiments enable a vector execution unit to selectively perform parallel operations on one or more available elements in a given vector in parallel. For example, an operation can be performed on only the first two of eight elements of the vector in parallel. In this case, the first two elements are "active elements," while the remaining six elements are "inactive elements." In the described embodiments, one or more other vectors can be used to determine which elements in a given operand vector are active (i.e., are to be operated on). For example, a "predicate vector" can include "active" elements that are used to determine which elements in the operand vector to perform operations on. In some embodiments, elements that contain data of a predetermined type are active elements (e.g., true, false, non-zero, zero, uppercase/lowercase characters, even/odd/prime numbers, vowels, whole numbers, etc.).

The terms "true" and "false" are used in this description to refer to data values (e.g., a data value contained in an element in a vector). Generally, in computer systems true and false are often represented by 1 and 0, respectively. In practice, a given embodiment could use any value to represent true and false, such as the number 55, or the letter "T."

Notation

In describing the embodiments in the instant application, we use the following formats for variables, which are vector quantities unless otherwise noted:

p5=a<b;
Elements of vector p5 are set to 0 or 1 depending on the result of testing a<b. Note that vector p5 can be a "predicate vector," as described in detail below. Some instructions that generate predicate vectors also set processor status flags to reflect the resulting predicates. For example, the processor status flags can include the FIRST, LAST, NONE, and/or ALL flags.

~p5; a=b+c;
Only elements in vector a designated by active (e.g., non-zero) elements in the predicate vector p5 receive the result of b+c. The remaining elements of a are unchanged. This operation is called "predication," and is denoted using the tilde ("~") sign before the predicate vector.

!p5; a=b+c;
Only elements in vector a designated by active (e.g., non-zero) elements in the predicate vector p5 receive the result of b+c. The remaining elements of a are set to zero. This operation is called "zeroing," and is denoted using the exclamation point ("!") sign before the predicate vector.

if (FIRST( )) goto ...; Also LAST( ), ANY( ), ALL( ), CARRY( ), ABOVE( ), or NONE( ), (where ANY( ) == !NONE( ))

These instructions test the processor status flags and branch accordingly.

x+=VECLEN;
VECLEN is a machine value that communicates the number of elements per vector. The value is determined at runtime by the processor executing the code, rather than being determined by the assembler.

// Comment
In a similar way to many common programming languages, the following examples use the double forward slash to indicate comments. These comments can provide information regarding the values contained in the indicated vector or explanation of operations being performed in a corresponding example.

In the examples in the instant application, other C++-formatted operators retain their conventional meanings, but are applied across the vector on an element-by-element basis. Where function calls are employed, they imply a single instruction that places any value returned into a destination register. For simplicity in understanding, all vectors described herein are vectors of integers, but alternative embodiments support other data formats.

Instruction Definitions

The described embodiments predict results for vector instructions that check for dependencies between the elements of a vector or between the elements of two or more different vectors as part of a process for determining the elements of the vector instructions for which an operation can be performed in parallel. For example, the ConditionalStop instruction is one such instruction, as is the CheckHazardP instruction. This section provides a brief description of the ConditionalStop and CheckHazardP instructions to enable a clearer understanding of the described embodiments.

Although we provide brief descriptions of the ConditionalStop and CheckHazardP instructions, the '333 application includes more detail about these instructions' operations and interactions with other instructions and operations. In addition, although we describe the ConditionalStop and CheckHazardP instructions as examples, the prediction operation can be performed for any vector instruction, scalar instruction, or operation of processor 102 that checks dependencies between the active elements of a vector or between the active elements of two or more different vectors. Moreover, although we use certain arrangements of instructions in describing the function of the ConditionaiStop and CheckHazardP instructions, a person of skill in the art will recognize that these concepts may be implemented using different arrangements or types of instructions without departing from the spirit of the described embodiments.

We describe these instructions using a signed-integer data type. However, in alternative embodiments, other data types or formats are used. Moreover, although Macroscalar instructions may take vector, scalar, or immediate arguments in practice, only vector arguments are shown here to avoid redundancy.

In the following examples, predication is communicated to the instructions via two variables. The vector gPred is the predicate vector that affects the instruction and/or the assignment of the result vector. Additionally, some instructions may reference gPred to affect the operation of the instruction apart from the final assignment. If an instruction is not predicated, then all elements are considered active, and the vector gPred contains all true indicators (i.e., the predicate vector is an assumed predicate vector).

Note that the format of the following instruction definitions is a statement of the instruction type followed by a description of the instruction that can include example code as well as one or more usage examples.

ConditionalStop

The ConditionalStop instruction takes the scalar parameter mode, which indicates any number of four possible transitions between true and false values of adjacent elements in predicate p that imply data dependencies. The parameter mode is a 4-bit field, the bits of which are defined as follows:

kTF—Implies a loop-carried dependency from an iteration for which the predicate is true, to the subsequent iteration for which the value of the predicate is false.

kFF—Implies a loop-carried dependency from an iteration for which the predicate is false, to the subsequent iteration for which the value of the predicate is false.

kFT—Implies a loop-carried dependency from an iteration for which the predicate is false, to the subsequent iteration for which the value of the predicate is true.

kTT—Implies a loop-carried dependency from an iteration for which the predicate is true, to the subsequent iteration for which the value of the predicate is true.

The 1-based (i.e., considering the vector as starting with element "1") element position corresponding to the iteration that generates the data that is depended upon is stored in the destination vector at the element position corresponding to the iteration that depends on the data. If no data dependency exists, a value of 0 is stored in the destination vector at that element. Note that the ConditionalStop instruction supports only zeroing; non-zeroing predication is illegal.

```
Vector ConditionalStop(Vector &p, int mode)
{
    Vector r = 0;
    for (int x=1; x<VECLEN; ++x) // Skip the first
    element
    {
        if (p.v[x-1] == 0 && p.v[x] == 0)
        {
            if (mode & kFF)
                r.v[x] = x;
        }
        else if (p.v[x-1] == 0 && p.v[x] == 1)
        {
            if (mode & kFT)
                r.v[x] = x;
        }
        else if (p.v[x-1] == 1 && p.v[x] == 0)
        {
            if (mode & kTF)
                r.v[x] = x;
        }
        else
        {
            if (mode & kTT)
                r.v[x] = x;
        }
    }
    return(r);
}
```

Examples:
 !p0; a=ConditionalStop(b, kTF|kFT);
  On Entry: p0={0 0 1 1 1 1 0 0}
   a={9 9 9 9 9 9 9 9}
   b={0 1 0 1 1 0 1 0}
  On Exit: a={0 0 2 3 0 5 0 0}

CheckHazardP

The CheckHazardP instruction examines two vectors of memory addresses (or array indices), corresponding to two memory operations, for potential data dependencies through memory. The vector first holds addresses for the first memory operation, and the vector second holds addresses for the second operation. The predicate p indicates which elements of second are to be operated upon. This instruction checks for addresses that overlap between each element of first and lower-numbered elements of second. In the case of multiple matches, only the highest-numbered position is recorded. As shown below, in some embodiments, the instruction processes all elements equivalently; however, predication is performed by the assignment of the result, and should be considered an integral part of this instruction.

The 1-based element position corresponding to the iteration that generates the data that is depended upon is stored in the destination vector at the element position corresponding to the iteration that is dependent upon the data. If no data dependency exists, a zero is stored in the destination vector at the element position corresponding to the iteration that does not have the dependency. Variants of this instruction should account for overlap between various sizes of data types.

The CheckHazardP instruction only supports zeroing predication. Non-zeroing predication is not allowed.

```
Vector CheckHazardP(Vector &first, Vector &second,
Vector &p)
{
    Vector result = 0;
    int x,y;
    for (x=0; x<VECLEN; ++x)
        for (y=0; y<x; ++y)
            if (p.v[y])
                if (OVERLAP(first.v[x],
                    second.v[y]))
                    result.v[x] = y + 1;
    return(result);
}
```

Examples:
 !p0; a=CheckHazardP(b,c,p1);
 On Entry: p0={1 1 1 1 1 1 0 0}
  a={9 9 9 9 9 9 9 9}
  b={1 2 1 2 2 2 1 5 6}
  c={1 1 2 2 4 5 6 7}
  p 1={1 1 0 1 1 1 1 1}
 On Exit: a={0 0 2 0 4 2 0 0}

Computer System

Figure 1:
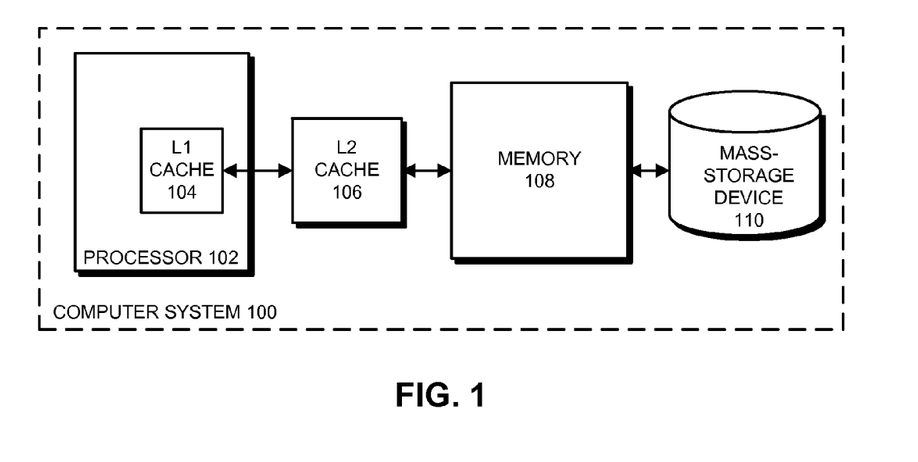
FIG. 1 presents a block diagram of a computer system in accordance with the described embodiments.

FIG. 1 presents a block diagram of a computer system 100 in accordance with the described embodiments. Computer system 100 includes processor 102, L2 cache 106, memory 108, and mass-storage device 110. Processor 102 includes L1 cache 104.

Processor 102 can be a general-purpose processor that performs computational operations. For example, processor 102 can be a central processing unit (CPU) such as a microprocessor, a controller, an application-specific integrated circuit (ASIC), or a field-programmable gate array (FPGA). In the described embodiments, processor 102 has one or more mechanisms for vector processing (i.e., vector execution units).

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments, L2 cache 106, memory 108, and mass-storage device 110 are shared between one or more processors in computer system 100. Such memory structures are well-known in the art and are therefore not described in more detail.

In some embodiments, the devices in the memory hierarchy (i.e., L1 cache 104, etc.) can access (i.e., read and/or write) multiple cache lines per cycle. These embodiments enable more effective processing of memory accesses that occur based on a vector of pointers or array indices to non-contiguous memory addresses. In addition, in some embodiments, the caches in the memory hierarchy are divided into a number of separate banks, each of which can be accessed in parallel. Banks within caches and parallel accesses of the banks are known in the art and hence are not described in more detail.

Computer system 100 can be incorporated into many different types of electronic devices. For example, computer system 100 can be part of a desktop computer, a laptop computer, a server, a media player, an appliance, a cellular phone, a piece of testing equipment, a network appliance, a personal digital assistant (PDA), a hybrid device (i.e., a "smart phone"), or another electronic device.

Although we use specific components to describe computer system 100, in alternative embodiments, different components may be present in computer system 100. For example, computer system 100 may not include some of the memory hierarchy (e.g., memory 108 and/or mass-storage device 110). Alternatively, computer system 100 may include video cards, video-capture devices, user-interface devices, network cards, optical drives, and/or other peripheral devices that are coupled to processor 102 using a bus, a network, or another suitable communication channel. Computer system 100 may also include one or more additional processors, wherein the processors share some or all of L2 cache 106, memory 108, and mass-storage device 110.

Processor

Figure 2:
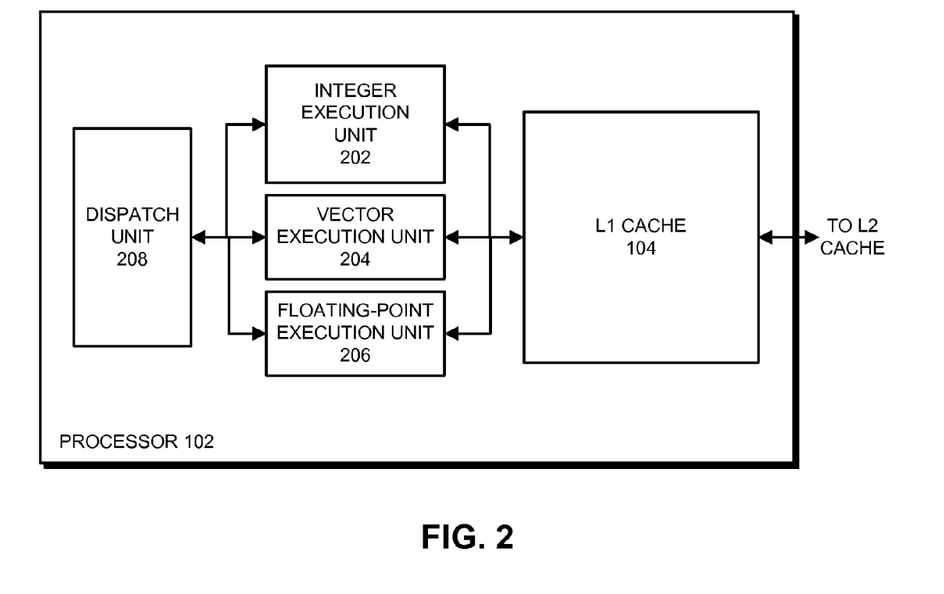
FIG. 2 presents an expanded view of a processor in accordance with the described embodiments.

FIG. 2 presents an expanded view of processor 102 in accordance with the described embodiments. As is shown in FIG. 2, processor 102 includes L1 cache 104, dispatch unit 208, integer execution unit 202, floating-point execution unit 206, and vector execution unit 204 (integer execution unit 202, floating-point execution unit 206, and vector execution unit 204 as a group are interchangeably referred to as "the execution units").

Dispatch unit 208 receives decoded instructions from a decode unit (not shown) in processor 102 and dispatches the decoded instructions to the appropriate execution units. Dispatch unit 208 is described in more detail below with respect to FIG. 4.

Each of execution units 202-206 is used for performing computational operations, such as logical operations, mathematical operations, or bitwise operations for an associated type of operand. More specifically, integer execution unit 202 is used for performing computational operations that involve integer operands, floating-point execution unit 206 is used for performing computational operations that involve floating-point operands, and vector execution unit 204 is used for performing computational operations that involve vector operands. Integer execution units and floating-point execution units are generally known in the art and are not described in more detail.

Figure 3:
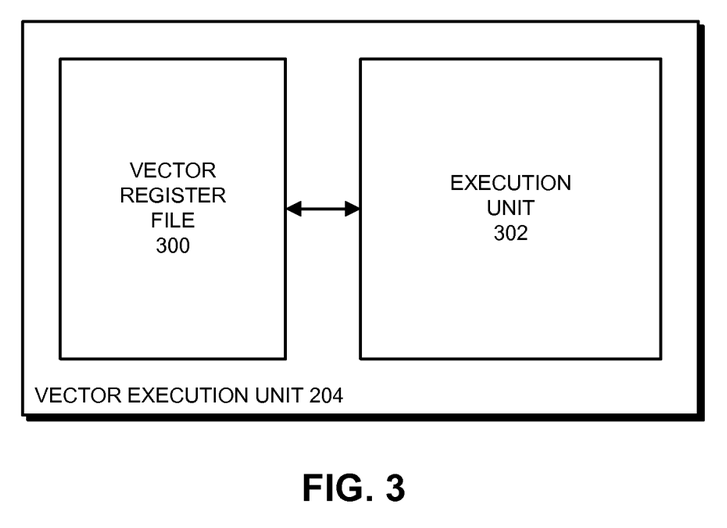
FIG. 3 presents an expanded view of a vector execution unit in accordance with the described embodiments.

In the described embodiments, vector execution unit 204 is a single-instruction-multiple-data (SIMD) execution unit that performs operations in parallel on some or all of the data elements that are included in vectors of operands. FIG. 3 presents an expanded view of vector execution unit 204 in accordance with the described embodiments. As is shown in FIG. 3, vector execution unit 204 includes a vector register file 300 and an execution unit 302. Vector register file 300 includes a set of vector registers that can hold operand vectors and result vectors for execution unit 302. In some embodiments, there are 32 vector registers in the vector register file, and each register includes 128 bits. In alternative embodiments, there are different numbers of vector registers and/or different numbers of bits per register.

Execution unit 302 retrieves operands from registers in vector register file 300 and executes vector instructions that cause execution unit 302 to perform operations in parallel on some or all of the data elements (or, simply, "elements") in the operand vector. For example, execution unit 302 can perform logical operations, mathematical operations, or bitwise operations on the elements in the vector. Execution unit 302 can perform one vector operation per cycle (although the "cycle" may include more than one cycle of a clock used to trigger, synchronize, and/or control execution unit 302's computational operations).

In the described embodiments, execution unit 302 supports vectors that hold N data elements (e.g., bytes, words, doublewords, etc.). In these embodiments, execution unit 302 can perform operations on N or fewer of the data elements in an operand vector in parallel. For example, assuming an embodiment where the vector is 256 bits in length (i.e., 32 bytes), the data elements being operated on are four-byte words, and the operation is adding a value to the data elements, these embodiments can add the value to any number of the eight words in the vector.

In the described embodiments, execution unit 302 includes at least one control signal that enables the dynamic limitation of the data elements in an operand vector on which execution unit 302 operates. Specifically, depending on the state of the control signal, execution unit 302 may or may not operate on all the data elements in the vector. For example, assuming an embodiment where the vector is 512 bits in length and the data elements being operated on are four-byte words, the control signal can be asserted to prevent operations from being performed on some or all of 16 data words in the operand vector. Note that "dynamically" limiting the data elements in the operand vector upon which operations are performed can involve asserting the control signal separately for each cycle at runtime.

In some embodiments, based on the values contained in a vector of predicates or one or more scalar predicates, execution unit 302 applies vector operations to selected vector data elements only. In some embodiments, the remaining data elements in a result vector remain unaffected (which we call "predication") or are forced to zero (which we call "zeroing"). In some of these embodiments, the clocks for the data element processing subsystems ("lanes") that are unused due to predication or zeroing in execution unit 302 can be gated, thereby reducing dynamic power consumption in execution unit 302.

The described embodiments are vector-length agnostic. Thus, a compiler or programmer need not have explicit knowledge of the vector length supported by the underlying hardware (e.g., vector execution unit 302). In these embodiments, a compiler generates or a programmer writes program code that need not rely on (or use) a specific vector length (some embodiments are forbidden from even specifying a specific vector size in program code). Thus, the compiled code in these embodiments (i.e., binary code) runs on other embodiments with differing vector lengths, while potentially realizing performance gains from processors that support longer vectors. Consequently, as process technology allows longer vectors, execution of legacy binary code simply speeds up without any effort by software developers.

In some embodiments, vector lengths need not be powers of two. Specifically, vectors of 3, 7, or another number of data elements can be used in the same way as vectors with power-of-two numbers of data elements.

In the described embodiments, each data element in the vector can contain an address that is used by execution unit 302 for performing a set of memory accesses in parallel. In these embodiments, if one or more elements of the vector contain invalid memory addresses, invalid memory-read operations can occur. In these embodiments, invalid memory-read operations that would otherwise result in program termination instead cause any elements with valid addresses to be read and elements with invalid elements to be flagged, allowing program execution to continue in the face of speculative, and in hindsight illegal, read operations.

In some embodiments, processor 102 (and hence execution unit 302) is able to operate on and use vectors of pointers. In these embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

Figure 4:
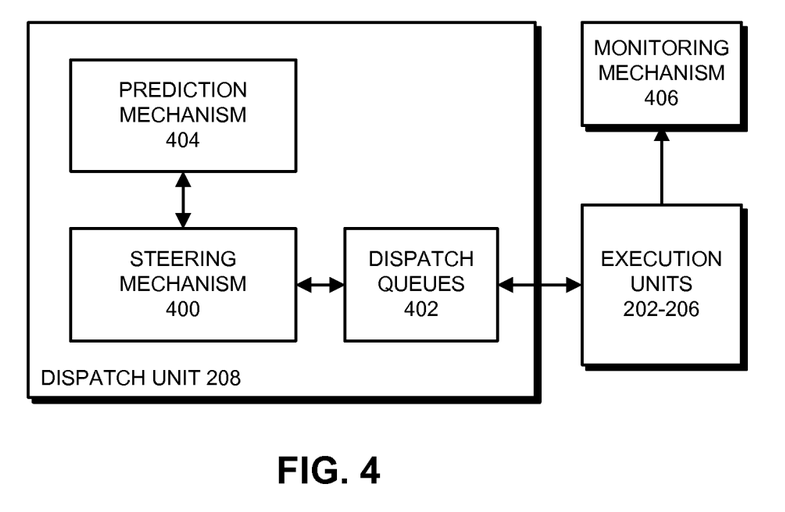
FIG. 4 presents a block diagram of a dispatch unit and a monitoring mechanism in accordance with some embodiments.

FIG. 4 presents a block diagram of dispatch unit 208 and monitoring mechanism 406 in accordance with some embodiments. As can be seen in FIG. 4, dispatch unit 208 includes steering mechanism 400 and dispatch queues 402. Steering mechanism 400 and dispatch queues 402 are used for dispatching decoded instructions to execution units 202-206. Dispatch queues 402 includes a first-in-first-out (FIFO) dispatch queue for each of the execution units. As each decoded instruction is received from the decode unit, steering mechanism 400 determines the appropriate execution unit for the instruction (e.g., floating-point execution unit 206 for floating-point instructions, etc.) and "steers" the instruction to corresponding execution unit by placing the instruction in a next available position in the dispatch queue for the execution unit. Dispatch unit 208 can then release an instruction per cycle from each of the dispatch queues to the corresponding execution unit for execution.

In addition to the mechanisms for dispatching decoded instructions, dispatch unit 208 includes prediction mechanism 404. Generally, given a dependency-checking instruction, prediction mechanism 404 determines if the values in a result vector for the dependency-checking instruction are predictable and, if so, dispatches a prediction micro-operation to vector execution unit 204 to be executed. When executed, the prediction micro-operation generates a predicted result vector for the dependency-checking instruction in which all of the active elements are set to zero. The predicted result vector can then be used to indicate that no dependencies exist between the active elements of the one or more vectors that are checked by the dependency-checking instruction when executing one or more subsequent dependent instructions. (Note that, as described below, the prediction micro-operation can be generated by prediction mechanism 404 or can be decoded from a compiler-inserted prediction instruction.)

Processor 102 also includes monitoring mechanism 406, which includes mechanisms for handling the execution of subsequent vector instructions based on the predicted result vector, determining if the prediction was correct, performing remedial actions if the prediction was incorrect, and keeping one or more records regarding the outcome of the prediction that can be used in making subsequent predictions.

Note that, although we show prediction mechanism 404 as being included in dispatch unit 208, and monitoring mechanism 406 as a separate mechanism, in some embodiments, some or all of the mechanisms are arranged differently. For example, some or all of monitoring mechanism 406 can be included in dispatch unit 208 and/or in execution units 202-206.

Although we describe processor 102 as including a particular set of units, in alternative embodiments, processor 102 can include different numbers or types of units. Moreover, although the embodiment shown in FIG. 2 is limited to a particular set of functional blocks, in the described embodiments, processor 102 can include other functional blocks, such as an instruction fetch unit, a branch unit, a memory management unit, I/O interfaces, etc. coupled to the execution units. The additional functional blocks that can be present in processor 102 are known in the art and are not described in more detail.

Prediction of Dependencies

Generally, in Macroscalar processors (i.e., in processors based on the Macroscalar architecture), iterations of loops can be executed in parallel using corresponding elements of a vector instruction. As described above, in these processors, the vector instructions can be partitioned so that only elements that can safely be operated on in parallel are operated on by a vector instruction. This "vector partitioning" is determined based on a run-time dependency analysis. The dependency analysis depends in turn on calculating the values to be analyzed. Thus, in prior Macroscalar processors, vector partitioning could not begin until the values to be analyzed had been computed.

However, for many loops, the dependency-analysis almost always determines that there are no dependencies. For example, "no dependencies" results almost always occur for loops that include checks for "may-alias" conditions between memory references (i.e., memory references which cannot be statically resolved by a compiler). In such loops, vector partitioning, with its attendant dependency analysis, is performed for correctness, but rarely, if ever, executes more than once (iterates) at run-time. In other words, on a first pass, the dependency check almost always determines that all of the elements of the vector instruction(s) for the loop can safely be executed in parallel. Thus, the operations for the loop are delayed while the processor performs the largely needless verification that the dependencies do not exist—which affects the processor's performance.

In order to avoid the effect on performance caused by unnecessarily performing dependency analyses during vector partitioning, the described embodiments include a prediction mechanism in processor 102 that can be used to predict a result for a dependency-checking instruction that performs the dependency checks during the dependency analysis. In these embodiments, the prediction mechanism determines when dependencies are unlikely to exist for all of the active elements of the vector instruction and predicts a result vector that indicates that there are no dependencies for the vector instruction. Based on the prediction, the prediction mechanism can generate a predicted result vector for which each active element contains a zero. Using the predicted result vector, processor 102 can then immediately execute subsequent instructions.

However, when using the predicted result vector to execute subsequent instructions, processor 102 records that the execution is speculative. When the actual result returns from executing the dependency-checking instruction (i.e., the dependency-checking instruction for which the result was predicted), processor 102 checks the actual result against the predicted result. If the actual result and the predicted result do not match, processor 102 can discard the results from instructions executed using the predicted result vector and perform a remedial action. In some embodiments, when performing the remedial action, processor 102 recovers the processor state and restarts execution of instructions at the instruction following the predicted dependency-checking instruction using the actual result.

Figure 5:
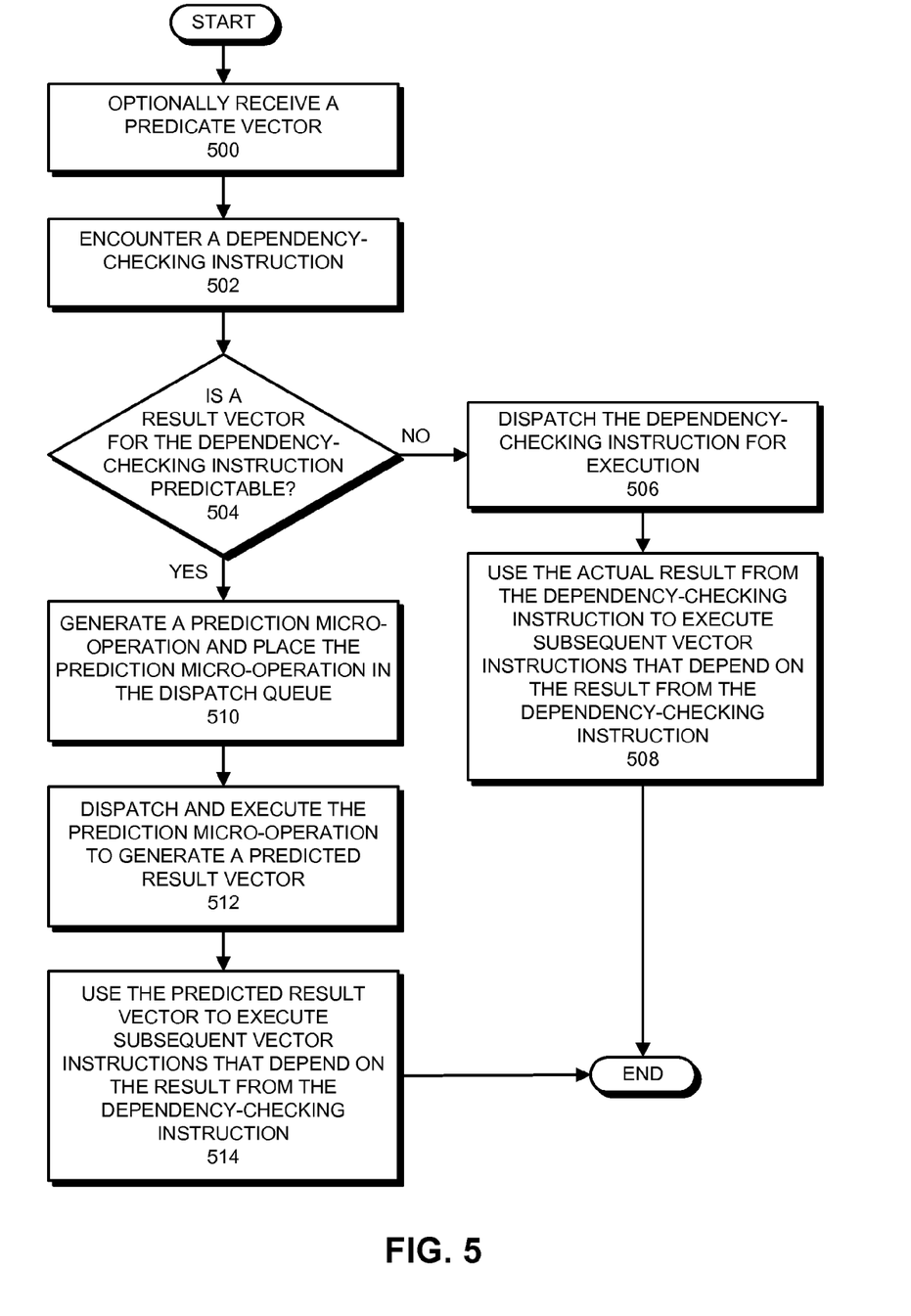
FIG. 5 presents a flowchart illustrating a process for predicting the result of a dependency-checking instruction using a hardware prediction mechanism in accordance with the described embodiments.

Predicting a Result for a Dependency-Checking Instruction using Hardware Prediction FIG. 5 presents a flowchart illustrating a process for predicting the result of a dependency-checking instruction using a hardware prediction mechanism 404 in processor 102 in accordance with the described embodiments.

The process shown in FIG. 5 starts when processor 102 optionally receives a predicate vector (step 500). Recall that processor 102 uses active elements of the predicate vector to determine the elements of a dependency-checking instruction (see step 502) for which result vector elements are generated. However, if processor 102 does not receive a predicate vector, processor 102 assumes a predicate vector for which all elements are active, and performs the following operations for each element of the dependency-checking instruction. Note also that the predicate vector, be it received or assumed, is originally associated with the dependency-checking instruction, but is also used in predicting the result vector for the dependency-checking instruction—if such a prediction is made.

Prediction mechanism 404 then encounters a dependency-checking instruction (step 502). In the embodiments described with respect to FIG. 5, prediction mechanism 404 encounters the dependency-checking instruction while monitoring instructions that are received by steering mechanism 400. In these embodiments, processor 102 monitors the instructions to determine when a dependency-checking instruction is to be dispatched. As described above, a dependency-checking instruction generally checks for dependencies between the active elements of one or more vectors, and generates a result vector that indicates where dependencies, if any, were encountered (a dependency exists when a given element of a vector depends on at least one prior element in the vector or in another vector(s)). For example, prediction mechanism can monitor the instructions for a Conditional-Stop instruction, a CheckHazardP instruction, or another instruction that checks for dependencies between the active elements of one or more vectors.

Next, prediction mechanism 404 determines if a result vector for the dependency-checking instruction is predictable (step 504). In making the determination, prediction mechanism 404 determines whether it is likely that all of the active elements of a result vector generated by the dependency-checking instruction will be set to zero, indicating that dependencies are unlikely to be encountered between the active elements of the one or more vectors.

The determination whether a result vector for the dependency-checking instruction is predictable that is made by prediction mechanism 404 can be based on one or more factors. Generally, any factor that can be used to characterize the dependency-checking instruction (e.g., the type, address, inputs, outputs, etc. of the dependency-checking instruction), the history of instruction execution (i.e., the dependency-checking instruction itself and/or other instructions), the past or current state of processor 102, etc. can be used in making the determination. As examples, prediction mechanism 404 can make the prediction based on one or more of the following factors: (1) a record in processor 102 indicates that the dependency-checking instruction generated a result vector for which all of the active elements were set to zero when executed one or more previous times; (2) a table lookup computed from an address of the dependency-checking instruction returns a confirmation that the active elements of a result vector from the dependency-checking instruction are all likely to be set to zero; (3) one or more processor tracking mechanisms are set to indicate that the active elements of a result vector from the dependency-checking instruction are all likely to be set to zero; (4) a computation made by a prediction computation mechanism (e.g., a fuzzy logic, processor, neural network, etc.) in prediction mechanism 404 indicates that the active elements of a result vector from the dependency-checking instruction are all likely to be set to zero; (5) the variant of the dependency-checking instruction being predicted indicates that the active elements of result vector from the dependency-checking instruction are all likely to be set to zero; (6) the addresses of one or more prior instructions of a given type that preceded the dependency-checking instruction indicate that the active elements of the result vector from the dependency-checking instruction are all likely to be set to zero; (7) one or more factors related to executing instructions prior to the dependency-checking instruction (a code-path history) indicate that the active elements of the result vector from the dependency-checking instruction are all likely to be set to zero; (8) a pattern of taken or not-taken branches for a number of branches that preceded the dependency-checking instruction that is being predicted indicates that the active elements of the result vector from the dependency-checking instruction are all likely to be set to zero; (9) a value of counter indicating the number of occurrences of an event (e.g., a prior prediction) indicates that the active elements of the result vector from the dependency-checking instruction are all likely to be set to zero; or (10) a value of a variable representing a confidence level of predicting the dependency-checking instruction, in which the confidence level is adjusted based on the relationship between at least one prior prediction, indicates that the active elements of the result vector from the dependency-checking instruction are all likely to be set to zero. In these embodiments, prediction mechanism 404 can store a value that represents each factor to be used in making a decision and then can perform one or more mathematical, logical, combinatory, comparison, or algorithmic operations using the values to make the determination.

In addition, when making the determination whether a result vector is predictable, prediction mechanism 404 can determine that all active elements in the result vectors for all dependency-checking instructions are to be predicted in the same way. That is, predict that the active elements in the result vectors for all dependency-checking instruction will contain zero. In some embodiments, the prediction can be made without considering any of the above-described factors, i.e., can be automatic.

In the described embodiments, prediction mechanism 404 can include one or more variables, memory locations, registers, lookup tables, status flags/indicators, functional blocks, or other mechanisms or circuit structures that are used to hold values representing the factors to enable prediction mechanism 404 to determine if the result vector for the dependency-checking instruction is predictable. Prediction mechanism 404 can use these mechanisms to maintain records of the one or more factors that are used in making the determination. Prediction mechanism 404 and/or processor 102 can additionally compute values to be used by prediction mechanism 404 for making the determination. These values can be computed at the time that the determination is to be made or can be automatically computed whenever a relevant event occurs and stored in one or more of the mechanisms in prediction mechanism 404.

In these embodiments, if prediction mechanism 404 determines that a result vector for the dependency-checking instruction cannot be predicted with sufficient likelihood of success, prediction mechanism 404 does not predict the result vector (step 504). For example, prediction mechanism 404 can determine that the result of the dependency-checking instruction cannot be predicted if it is likely that the result vector include both zeroes and other values; if it is not sufficiently clear whether all of the values of the result vector will be all zero based on the one or more factors used in making the determination; and/or if it is not clear whether or not dependencies are likely to be encountered between the active elements of the one or more vectors. In the event that the result vector cannot be predicted, the dependency-checking instruction is dispatched and executed (step 506), and processor 102 awaits the actual result vector from the dependency-checking instruction to be used as an input for subsequent instructions (step 508). Note that in this case, prediction mechanism 404 does not generate/dispatch the prediction micro-operation that is described in more detail below.

Upon determining that a result vector for the dependency-checking instruction is predictable (step 504), prediction mechanism 404 generates a prediction micro-operation and places the prediction micro-operation in the dispatch queue for vector execution unit 204 (step 510). More specifically, upon determining that the active elements in the result vector for the dependency-checking instruction are all likely to be set to zero, prediction mechanism 404 generates a prediction micro-operation that generates an output vector in which each active element is set to zero and places the prediction micro-operation in the dispatch queue before the dependency-checking instruction. Note that the dependency-checking instruction is also placed in the dispatch queue (albeit after the prediction micro-operation) because the dependency-checking instruction is also executed to generate an actual result vector for comparison with the predicted result vector generated by the prediction micro-operation. In some embodiments, generating the prediction micro-operation comprises generating an all-zero variant of the prediction micro-operation.

When the prediction micro-operation eventually arrives at the head of the dispatch queue, dispatch unit 208 dispatches the prediction micro-operation to vector execution unit 204 to be executed and generate the predicted result vector (step 512). Unlike the dependency-checking instruction, the prediction micro-operation has no dependencies (aside from a predicate vector, which is either available before the prediction micro-operation is dispatched or is assumed). Thus, as soon as the prediction micro-operation is received in vector execution unit 204, it can be executed to generate the predicted result vector. In contrast, the dependency-checking instruction may be stalled in dispatch unit 208 and/or in the execution unit 204 until dependency for the dependency-checking instruction can be resolved. Generally, this means that the prediction micro-operation, which both executes first and has no dependencies, can generate a predicted result vector before the actual result vector can be generated by the dependency-checking instruction. Note that, although the prediction micro-operation is executed to generate the predicted result vector, the dependency-checking instruction is still dispatched and executed to generate an actual result vector that is eventually compared to the predicted result vector as a verification of the prediction.

Processor 102 then uses the predicted result vector to execute subsequent vector instructions that depend on the result from the dependency-checking instruction (step 514). In some embodiments, after generating the predicted result vector, while dispatching one or more subsequent vector instructions that depend on the result of the dependency-checking instruction (i.e., that use the result vector generated by the dependency-checking instruction), processor 102 modifies the dependency of the subsequent vector instructions so that the subsequent vector instructions use the predicted result vector output from the prediction micro-operation instead of the actual result vector output from the dependency-checking instruction. Thus, the subsequent instructions use the predicted result vector as an input instead of using the actual result vector generated by the dependency-checking instruction.

As described below, using the predicted result vector includes performing other operations to ensure that the prediction was correct and to perform remedial actions when the prediction was incorrect.

Figure 6:
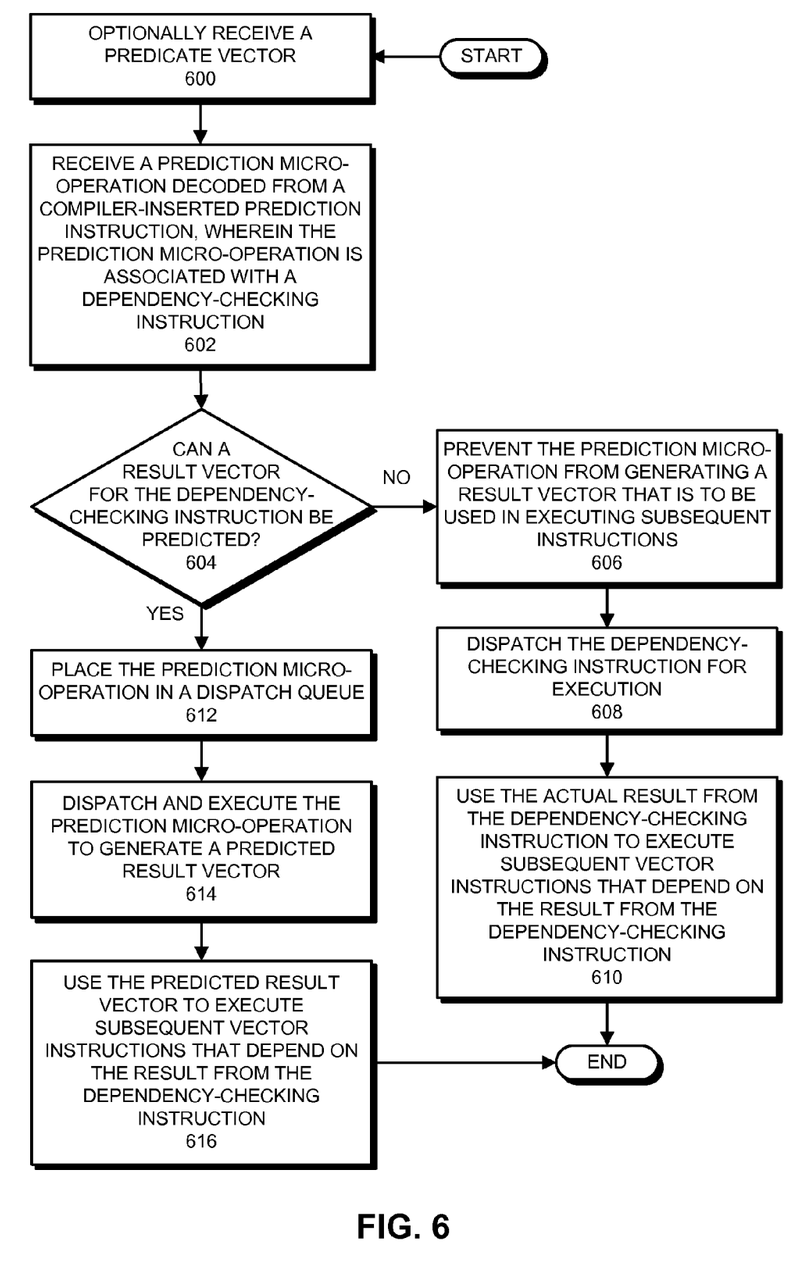
FIG. 6 presents a flowchart illustrating a process for predicting the result of a dependency-checking instruction using a compiler-inserted prediction instruction in accordance with the described embodiments.

Predicting a Result for a Dependency-Checking Instruction using a Compiler-Inserted Prediction Instruction FIG. 6 presents a flowchart illustrating a process for predicting the result of a dependency-checking instruction using a compiler-inserted prediction instruction in accordance with the described embodiments. In the embodiments shown in FIG. 6, during a compilation process, a compiler inserts prediction instructions that are each associated with a corresponding dependency-checking instruction. The prediction instructions, when decoded at runtime, generate corresponding prediction micro-operations. The prediction micro-operation, if dispatched and executed, generates a predicted result vector for the associated dependency-checking instruction.

The embodiments shown in FIG. 6 differ from the embodiments shown in FIG. 5 in that the prediction micro-operation is not generated by prediction mechanism 404 following a determination whether the dependency-checking instruction is predictable. In addition, in some of the embodiments shown in FIG. 6, prediction mechanism 404 does not monitor instructions to determine when a dependency-checking instruction has been encountered. Instead, in these embodiments, prediction mechanism 404 simply processes compiler-inserted prediction micro-operations. Thus, prediction mechanism 404 may include less mechanisms/functional blocks in the embodiments shown in FIG. 6 (although the compiler in these embodiments includes code/logic for generating prediction instructions).

The process shown in FIG. 6 starts when processor 102 optionally receives a predicate vector (step 600). Recall that processor 102 uses active elements of the predicate vector to determine the elements of a dependency-checking instruction (see step 602) for which result vector elements are generated. However, if processor 102 does not receive a predicate vector, processor 102 assumes a predicate vector for which all elements are active, and performs the following operations for each element of the dependency-checking instruction. Note also that the predicate vector, be it received or assumed, is originally associated with the dependency-checking instruction, but is also used in predicting the result vector for the dependency-checking instruction—if such a prediction is made.

Prediction mechanism 404 then receives a prediction micro-operation decoded from a compiler-inserted prediction instruction, wherein the prediction micro-operation is associated with a prediction-generating instruction (step 602). As described above, the compiler inserts the prediction instruction in the program code relative to the dependency-checking instruction during compilation based on an analysis of the program code. Note that the compiler inserts a prediction instruction that, when decoded, generates a variant of the prediction micro-operation that generates a result vector for which all active elements are set to zero.

Next, prediction mechanism 404 determines if a result vector for the dependency-checking instruction can be predicted (step 604). In making the determination, prediction mechanism 404 determines whether it is likely that all of the active elements of a result vector generated by the dependency-checking instruction will be set to zero, which indicates that dependencies are unlikely to be encountered between the active elements of the one or more vectors.

The determination whether a result vector for the dependency-checking instruction is predictable that is made by prediction mechanism 404 can be based on one or more factors. Generally, any factor that can be used to characterize the dependency-checking instruction (e.g., the type, address, inputs, outputs, etc. of the dependency-checking instruction), the history of instruction execution (i.e., the dependency-checking instruction itself and/or other instructions), the past or current state of processor 102, etc. can be used in making the determination. Some exemplary factors are listed in the description of FIG. 5.

In addition, when making the determination whether a result vector is predictable (i.e., can be predicted), prediction mechanism 404 can determine that all active elements in the result vectors for all dependency-checking instructions will contain zero. In some embodiments, the prediction can be made without considering any of the above-described factors, i.e., can be automatic.

In the described embodiments, prediction mechanism 404 can include one or more variables, memory locations, registers, lookup tables, status flags/indicators, functional blocks, or other mechanisms or circuit structures that are used to hold values representing the factors to enable prediction mechanism 404 to determine if the result vector for the dependency-checking instruction is predictable. Prediction mechanism 404 can use these mechanisms to maintain records of the one or more factors that are used in making the determination. Prediction mechanism 404 and/or processor 102 can additionally compute values to be used by prediction mechanism 404 for making the determination. These values can be computed at the time that the determination is to be made or can be automatically computed whenever a relevant event occurs and stored in one or more of the mechanisms in prediction mechanism 404.

In these embodiments, if prediction mechanism 404 determines that a result vector for the dependency-checking instruction cannot be predicted with sufficient likelihood of success, prediction mechanism 404 does not predict the result vector (step 604). For example, prediction mechanism 404 can determine that the result of the dependency-checking instruction cannot be predicted if it is likely that the result vector include both zero and other values; if it is not sufficiently clear whether all of the values of the result vector will be all zero based on the one or more factors used in making the determination; and/or if it is not clear whether or not dependencies are likely to be encountered between the active elements of the one or more vectors.

In the event that the result vector cannot be predicted, prediction mechanism 404 prevents the prediction micro-operation from generating a result vector that is to be used in executing subsequent instructions (step 606). For example, prediction mechanism 404 can prevent the prediction micro-operation from being placed in the dispatch queue, can invalidate the prediction micro-operation (i.e., set an indicator in processor 102 that the prediction micro-operation is invalid), can cause the result of the prediction micro-operation to be invalidated or deleted, or can perform another operation to prevent the result of the prediction micro-operation from affecting subsequent execution. Dispatch unit 208 then dispatches the dependency-checking instruction for execution (step 608). Next, processor 102 awaits the actual result vector from the dependency-checking instruction to be used as an input for subsequent instructions (step 610).

Upon determining that a result vector for the dependency-checking instruction can be predicted (step 604), prediction mechanism 404 places the prediction micro-operation in the dispatch queue for vector execution unit 204 (step 612). Note that the dependency-checking instruction is also placed in the dispatch queue (albeit after the prediction micro-operation) because the dependency-checking instruction is also executed to generate an actual result vector for comparison with the predicted result vector generated by the prediction micro-operation.

When the prediction micro-operation eventually arrives at the head of the dispatch queue, dispatch unit 208 dispatches the prediction micro-operation to vector execution unit 204 to be executed and generate the predicted result vector (step 614). As described above with respect to FIG. 5, unlike the dependency-checking instruction, the prediction micro-operation has no dependencies (aside from a predicate vector, which is either available before the prediction micro-operation is dispatched or is assumed). Thus, as soon as the prediction micro-operation is received in vector execution unit 204, it can be executed to generate the predicted result vector.

Processor 102 then uses the predicted result vector to execute subsequent vector instructions that depend on the result from the dependency-checking instruction (step 616). In some embodiments, after generating the predicted result vector, while dispatching one or more subsequent vector instructions that depend on the result of the dependency-checking instruction (i.e., that use the result vector generated by the dependency-checking instruction), processor 102 modifies the dependency of the subsequent vector instructions so that the subsequent vector instructions use the predicted result vector output from the prediction micro-operation instead of the actual result vector output from the dependency-checking instruction. Thus, the subsequent instructions use the predicted result vector as an input instead of using the actual result vector generated by the dependency-checking instruction.

As described below, using the predicted result vector includes performing other operations to ensure that the prediction was correct and to perform remedial actions when the prediction was incorrect.

Verification of Prediction

In both of the embodiments shown in FIGS. 5-6, because the dependency of the subsequent vector instructions is modified and/or because the correctness of the prediction cannot be ensured until the predicted result vector is compared to the actual result vector, processor 102 treats the execution of instructions executed using the predicted result vector as speculative until the comparison can be made. Thus, monitoring mechanism 406 includes one or more mechanisms for recording that vector instructions are being executed based on the predicted result of the dependency-checking instruction. For example, in some embodiments, monitoring mechanism 406 includes a speculative execution indicator that is set upon dispatching a prediction micro-operation. While this indicator is set, processor 102 treats execution as speculative. While speculatively executing the subsequent instructions, processor 102 performs one or more operations to ensure that the operating state of the processor can be recovered to a pre-speculation operating state. For example, processor 102 may preserve the pre-speculation architectural state and may not commit the results from speculatively executed instructions to the architectural state of processor 102.

When the dependency-checking instruction eventually finishes execution and generates an actual result vector, monitoring mechanism 406 compares the predicted result vector to the actual result vector. If the predicted result vector and the actual result vector do not match, processor 102 determines that the prediction was incorrect and performs a remedial action. For example, processor 102 can delete/invalidate the speculative results, restore the processor state, and begin executing instructions following the dependency-checking instruction using the actual result vector.

On the other hand, if the predicted result vector matches the actual result vector generated by the dependency-checking instruction, processor 102 clears the speculative execution indicator, commits the speculative results, and continues execution.

Making Predictions based on Prediction Accuracy

In some embodiments, prediction mechanism 404 includes a mechanism for tracking prediction accuracy for corresponding dependency-checking instructions. In these embodiments, the prediction accuracy can be kept as a value that represents a portion of the predictions that turned out to be correct and/or incorrect. For example, the prediction accuracy can be kept as a percentage of all the predictions made that proved to be correct. The prediction accuracy can be used as one of the factors in determining whether a dependency-checking instruction can be predicted. For example, if the prediction accuracy is below a threshold value (e.g., X % correct, last M predictions correct, etc.), prediction mechanism 404 may not make the prediction (or may only make the prediction if one or more of the other factors strongly indicates that the dependency-checking instruction is predictable).

In some embodiments, as part of tracking prediction accuracy, a value representing a confidence level can be kept based upon the past prediction(s) of one or more corresponding dependency-checking instructions. In these embodiments, the confidence level may be represented by a range of numerical values. For example, the confidence level in a given prediction can be represented by a value between −1 and +1, where −1 indicates a relatively high likelihood of a result vector for which all active elements are set to zero, and +1 indicates a relatively high likelihood of a result vector for which at least one active element is set to a non-zero value. In these embodiments, a confidence level more than a given distance from −1 indicates that, for the corresponding dependency-checking instruction, the values that the elements of a result vector are likely to be set is unclear (or, rather, it is not clear that the active elements will be set to zero). In these embodiments, prediction mechanism 404 may include one or more threshold confidence levels, below or above which a prediction is not made.

In the described embodiments, as part of the comparison operation performed by monitoring mechanism 406, monitoring mechanism 406 updates the confidence level of the prediction and/or the prediction accuracy. If the elements in the predicted result vector are all set to zero and the actual result vector contains one or more non-zero values, the confidence level for the prediction can be adjusted to a value that is closer to 1. If the elements in the predicted result vector are all set to zero and the actual result vector contains all zero, the confidence level for the prediction can be adjusted to a value that is closer to negative 1.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art.

Additionally, the above disclosure is not intended to limit the embodiments. The scope of the embodiments is defined by the appended claims.

What is claimed is:

1. A method for executing a vector instruction in a processor, comprising:
    while dispatching instructions at runtime, encountering a dependency-checking instruction;
    determining whether a result of the dependency-checking instruction is predictable by determining whether all of the active elements of a result vector generated by the dependency-checking instruction are likely to be set to zero;
    upon determining that a result of the dependency-checking instruction is predictable, dispatching a prediction micro-operation associated with the dependency-checking instruction, wherein the prediction micro-operation generates a predicted result vector for the dependency-checking instruction; and
    executing the prediction micro-operation, which comprises:
    optionally receiving a predicate vector; and
    generating a predicted result vector as an output of the prediction micro-operation, wherein, if the predicate vector is received, for each element of the predicted result vector for which the predicate vector is active, otherwise, for each element of the predicted result vector, generating the predicted result vector comprises setting the element of the predicted result vector to zero.

2. The method of claim 1, wherein the method further comprises:
    upon generating the predicted result vector, recording that subsequent vector instructions are being executed speculatively; and
    using the predicted result vector to execute subsequent vector instructions that depend on the result from the dependency-checking instruction.

3. The method of claim 1, wherein the method further comprises:
    dispatching the dependency-checking instruction;
    executing the dependency-checking instruction to generate an actual result vector;
    if the predicate vector is received, for each element of the predicted result vector for which the predicate vector is active, otherwise, for each element of the predicted result vector, comparing the element of the predicted result vector to the corresponding element of the actual result vector; and
    performing a remedial action if the comparison determines that the predicted result vector differs from the actual result vector.

4. The method of claim 3, wherein the method further comprises:
    maintaining a record of an outcome of the comparison, wherein the record comprises a record of a prediction accuracy.

5. The method of claim 4, wherein the method further comprises:
    when the prediction accuracy is below a threshold value, determining that the result of the dependency-checking instruction is unpredictable; and
    dispatching the dependency-checking instruction;
    executing the dependency-checking instruction to generate an actual result vector; and
    using the actual result vector to execute subsequent vector instructions that depend on the result from the dependency-checking instruction.

6. The method of claim 4, wherein the record of the prediction accuracy comprises a confidence level represented by a value between a first value and a second value, and wherein determining that a result of the dependency-checking instruction is predictable comprises:
    determining that a result of the dependency-checking instruction is predictable when the value of the confidence level is within a predetermined amount of the first value.

7. The method of claim 6, wherein the method further comprises:
    when active elements of the actual result vector include both zeroes and other-valued elements or when the active elements of the actual result vector include only other-valued elements, adjusting the confidence level toward the second value; and
    when active elements of the actual result vector include only zeroes, adjusting the confidence level toward the first value.

8. The method of claim 1, wherein the method further comprises:
    before dispatching subsequent vector instructions that depend on the dependency-checking instruction,
    modifying the dependency of the subsequent vector instructions from using the actual result vector from the dependency-checking instruction to using the predicted result vector generated by the prediction micro-operation.

9. The method of claim 1, wherein the method further comprises:
    upon determining that the result is not predictable for the dependency-checking instruction,
    dispatching the dependency-checking instruction;
    executing the dependency-checking instruction to generate an actual result vector; and
    using the actual result vector to execute subsequent vector instructions that depend on the result from the dependency-checking instruction.

10. The method of claim 1, wherein determining whether the result of the dependency-checking instruction is predictable comprises using one or more factors to determine if the result can be predicted for the dependency-checking instruction.

11. The method of claim 1, wherein the method further comprises:
    receiving the prediction micro-operation decoded from a compiler-inserted prediction instruction.

12. The method of claim 1, wherein the method further comprises:
    upon determining that a result vector of the dependency-checking instruction is predictable, generating the prediction micro-operation.

13. The method of claim 1, wherein the dependency-checking instruction comprises a CheckHazard instruction or a ConditionalStop instruction.

14. A processor that executes vector instructions, comprising:
    an execution unit in the processor; and
    a dispatch unit in the processor;
    wherein, while dispatching instructions at runtime, upon encountering a dependency-checking instruction, the dispatch unit is configured to determine whether a result of the dependency-checking instruction is predictable by determining whether all of the active elements of a result vector generated by the dependency-checking instruction are likely to be set to zero; and upon determining that a result of the dependency-checking instruction is predictable, the dispatch unit is configured to dispatch a prediction micro-operation associated with the dependency-checking instruction, wherein the prediction micro-operation generates a predicted result vector for the dependency-checking instruction; and wherein the execution unit is configured to execute the prediction micro-operation, which comprises:

optionally receiving a predicate vector; and generating a predicted result vector as an output of the prediction micro-operation, wherein, if the predicate vector is received, for each element of the predicted result vector for which the predicate vector is active, otherwise, for each element of the predicted result vector, generating the predicted result vector comprises setting the element of the predicted result vector to zero.

15. The processor of claim 14, wherein, upon generating the predicted result vector, the execution unit is configured to:

record that subsequent vector instructions are being executed speculatively; and use the predicted result vector to execute subsequent vector instructions that depend on the result from the dependency-checking instruction.

16. The processor of claim 14, wherein the dispatch unit is further configured to dispatch the dependency-checking instruction, and the execution unit is configured to:

execute the dependency-checking instruction to generate an actual result vector; and if the predicate vector is received, for each element of the predicted result vector for which the predicate vector is active, otherwise, for each element of the predicted result vector, compare the element of the predicted result vector to the corresponding element of the actual result vector;

wherein the processor is configured to perform a remedial action if the comparison determines that the predicted result vector differs from the actual result vector.

17. The processor of claim 16, further comprising:

a monitoring mechanism in the processor, wherein the monitoring mechanism is configured to maintain a record of an outcome of the comparison, wherein the record comprises a record of a prediction accuracy.

18. The processor of claim 17, wherein, when the prediction accuracy is below a threshold value, the dispatch unit is configured to:

determine that the result of the dependency-checking instruction is unpredictable; and dispatch the dependency-checking instruction;

wherein the execution unit is configured to:

execute the dependency-checking instruction to generate an actual result vector; and use the actual result vector to execute subsequent vector instructions that depend on the result from the dependency-checking instruction.

19. The processor of claim 17, wherein the record of the prediction accuracy comprises a confidence level represented by a value between a first value and a second value, and wherein when determining that a result of the dependency-checking instruction is predictable, the dispatch unit is configured to:

determine that a result of the dependency-checking instruction is predictable when the value of the confidence level is within a predetermined amount of the first value.

20. The processor of claim 19, wherein when the comparison determines that active elements of the actual result vector include both zeroes and other-valued elements or that the active elements of the actual result vector include only other-valued elements, the monitoring mechanism is configured to adjust the confidence level toward the second value; and when the comparison determines that active elements of the actual result vector include only zeroes, the monitoring mechanism is configured to adjust the confidence level toward the first value.

21. The processor of claim 14, wherein, before dispatching subsequent vector instructions that depend on the dependency-checking instruction, the dispatch unit is configured to modify the dependency of the subsequent vector instructions from using the actual result vector from the dependency-checking instruction to using the predicted result vector generated by the prediction micro-operation.

22. The processor of claim 14, wherein, upon determining that the result is not predictable for the dependency-checking instruction, the dispatch unit is configured to:

dispatch the dependency-checking instruction;

wherein the execution unit is configured to:

execute the dependency-checking instruction to generate an actual result vector; and use the actual result vector to execute subsequent vector instructions that depend on the result from the dependency-checking instruction.

23. The processor of claim 14, wherein when determining that the result of the dependency-checking instruction is predictable, the dispatch unit is configured to use one or more factors to determine if the result can be predicted for the dependency-checking instruction.

24. The processor of claim 14, wherein the dispatch unit is configured to receive the prediction micro-operation decoded from a compiler-inserted prediction instruction.

25. The processor of claim 14, wherein upon determining that a result vector of the dependency-checking instruction is predictable, the dispatch unit is configured to generate the prediction micro-operation.

26. The processor of claim 14, wherein the dependency-checking instruction comprises a CheckHazard instruction or a ConditionalStop instruction.

27. A computer system for executing a vector instruction in a processor, comprising:

a processor;

a memory coupled to the processor, wherein the memory stores data and instructions for the processor;

an execution unit in the processor; and a dispatch unit in the processor;

wherein, while dispatching instructions at runtime, upon encountering a dependency-checking instruction, the dispatch unit is configured to determine whether a result of the dependency-checking instruction is predictable by determining whether all of the active elements of a result vector generated by the dependency-checking instruction are likely to be set to zero; and upon determining that a result of the dependency-checking instruction is predictable, the dispatch unit is configured to dispatch a prediction micro-operation associated with the dependency-checking instruction, wherein the prediction micro-operation generates a predicted result vector for the dependency-checking instruction; and wherein the execution unit is configured to execute the prediction micro-operation, which comprises:

optionally receiving a predicate vector; and generating a predicted result vector as an output of the prediction micro-operation, wherein, if the predicate vector is received, for each element of the predicted result vector for which the predicate vector is active, otherwise, for each element of the predicted result vector, generating the predicted result vector comprises setting the element of the predicted result vector to zero.

* * * * *